Figure 4:
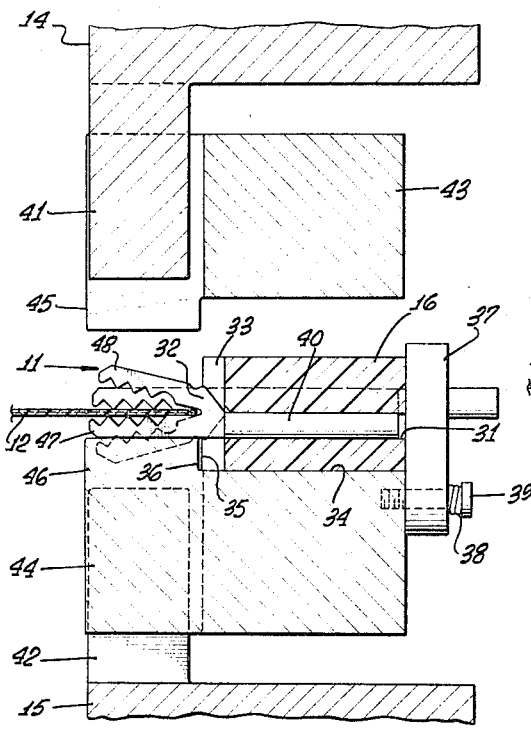

Nov. 15, 1966 R. N. FISHER ETAL 3,284,885
TOOL FOR CRIMPING TERMINATION ELEMENTS
TO FLAT ELECTRICAL CABLES
Filed Nov. 15, 1963 4 Sheets-Sheet 1
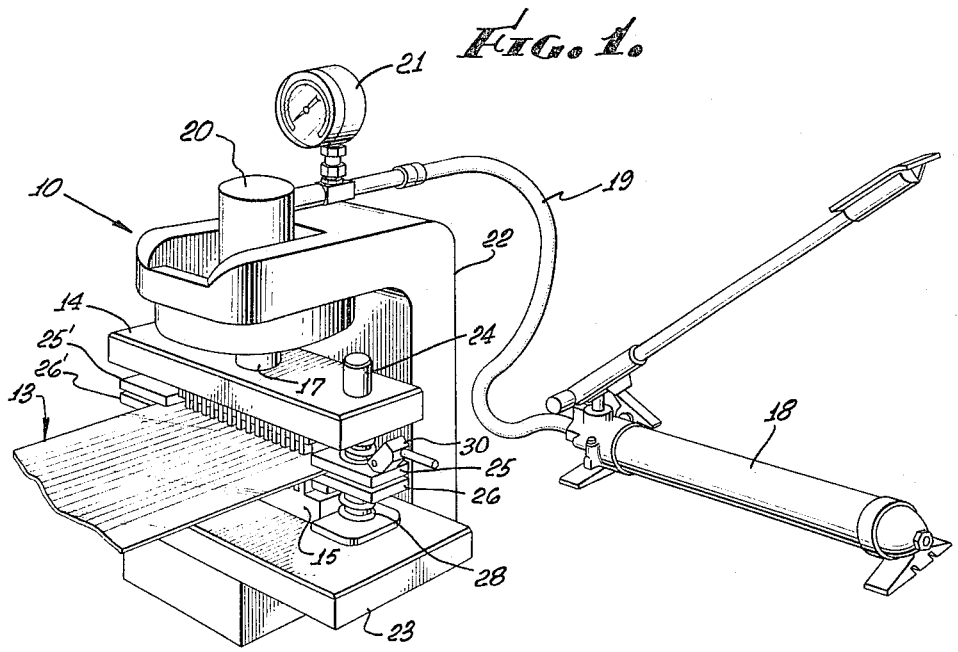
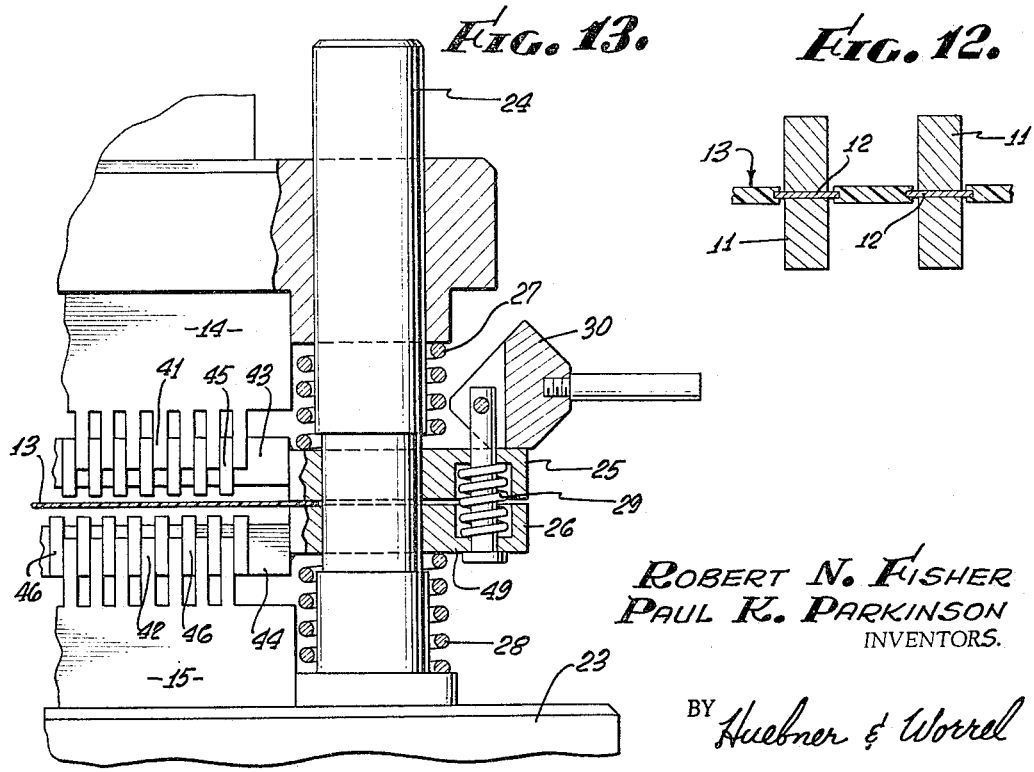
ROBERT N. FISHER
PAUL K. PARKINSON
INVENTORS.
BY Huebner & Worrel
ATTORNEYS.

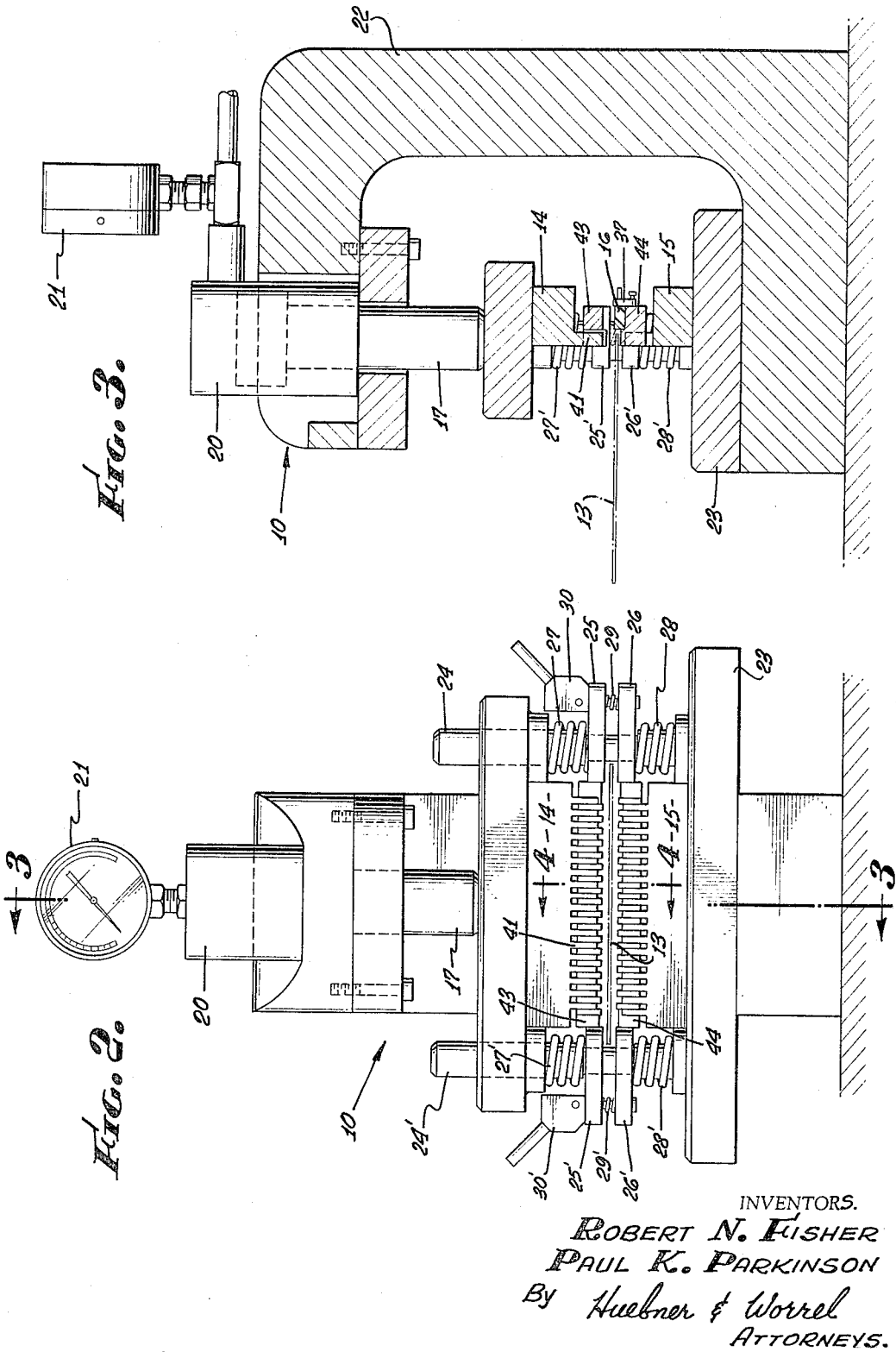

INVENTORS.
ROBERT N. FISHER
PAUL K. PARKINSON
By Huebner & Worrel
ATTORNEYS.

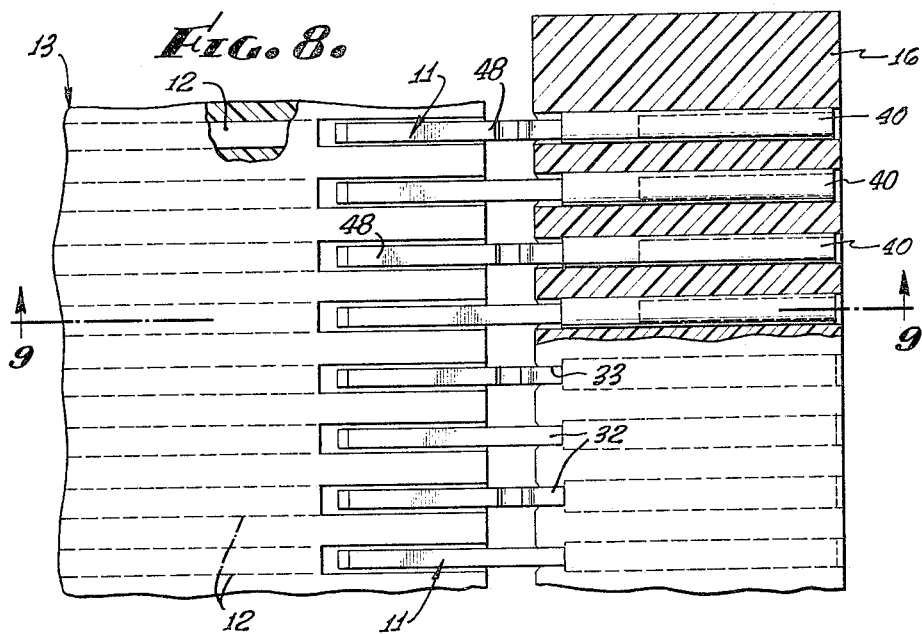
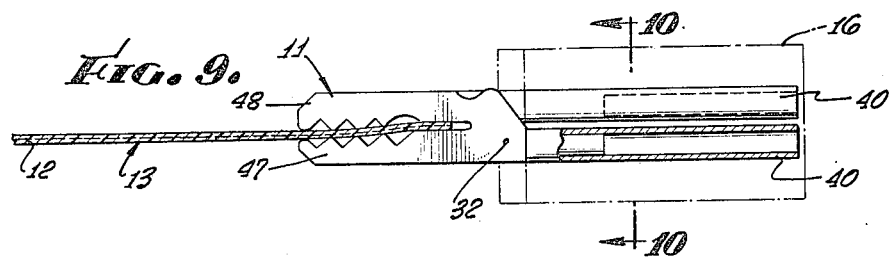
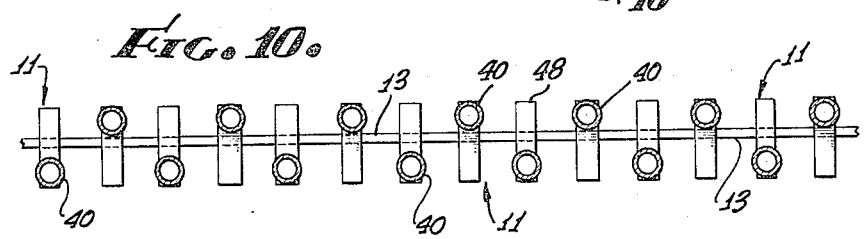
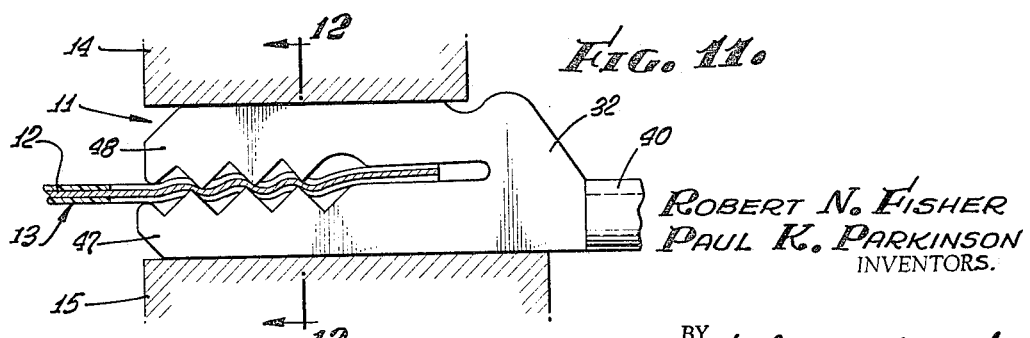
ROBERT N. FISHER
PAUL K. PARKINSON
INVENTORS.
BY Huebner & Worrel
ATTORNEYS.

United States Patent Office 3,284,885
Patented Nov. 15, 1966

3,284,885
TOOL FOR CRIMPING TERMINATION ELEMENTS TO FLAT ELECTRICAL CABLES
Robert N. Fisher, Los Angeles, and Paul K. Parkinson, Monterey Park, Calif., assignors, by mesne assignments, to International Telephone and Telegraph Corporation, New York, N.Y., a corporation of Maryland
Filed Nov. 15, 1963, Ser. No. 232,939
18 Claims. (Cl. 29—203)

This invention relates to a tool for crimping termination elements to flat electrical cables. More particularly, this invention relates to an apparatus which, in one operation, securely clamps a multiplicity of termination elements to a like multiplicity of conductor ribbons of flat electrical cables, commonly known as strip cables.

Termination elements for flat electrical conductors, such as the flat conductor ribbons of a strip cable, may take various forms. For example, such termination elements may comprise electrical connector contact terminals which are adapted to be engaged with other mating contact terminals. In such a case, the termination elements for the flat conductor ribbons will usually have a terminal portion at one end of the element adapted to be mechanically and electrically connected to a bare end of a respective conductor ribbon of the cable, and at the other end will have contacting means, such as a pin or socket or other means, which is mateable with another contact termination element. The use of such pin or socket contact termination elements as terminations for the flat conductor ribbons of a strip cable may, for example, be for the purpose of providing a transition from the flat cable to round wires.

Regardless of the purpose for which the flat conductor termination elements are to be employed, it has been conventional prior art practice to attach the termination elements to the flat conductor ribbons by soldering or welding. This is generally difficult to accomplish, as well as being time consuming, and has the added disadvantage that the termination elements cannot be readily disconnected from the ends of the conductor ribbons for repair or circuit reconstitution.

Because of the disadvantages and difficulties involved with the aforesaid practices of soldering and welding, it is desirable to crimp the termination elements to the respective conductor ribbons of a flat electrical cable. However, most prior art crimping tools are capable of crimping only a single element at a time, and use thereof for the present purpose therefore would involve a large number of separate crimping operations, with proper alignment of the elements being extremely difficult. Prior attempts to provide a tool for simultaneously crimping all of the termination elements to the respective conductor ribbons of a flat electrical cable have proven unsatisfactory due to inability to support all of the termination elements and the cable for accurate alignment of the elements with the respective conductors of the cable and difficulty in applying a uniform, firm and durable crimp for each connection.

Accordingly, an important object of this invention is to provide a tool which, in one operation, will securely crimp a multiplicity of termination elements to a corresponding multiplicity of flat electrical conductors.

Another object of this invention is to provide a crimping tool which will establish a correct alignment between a flat electrical cable having a plurality of conductor ribbons and a plurality of termination elements which are to be crimped by the tool to the ends of the respective conductor ribbons of the flat electrical cable.

A still further object of this invention is to provide a crimping tool which will establish a firm and durable electrical connection between the conductor ribbons of a flat electrical cable and a plurality of termination elements attached to the respective conductor ribbons of the cable.

Figure 5:
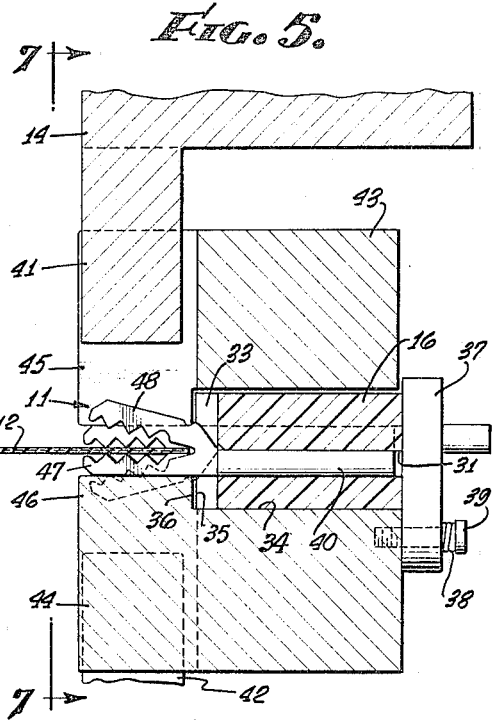
Figure 6:
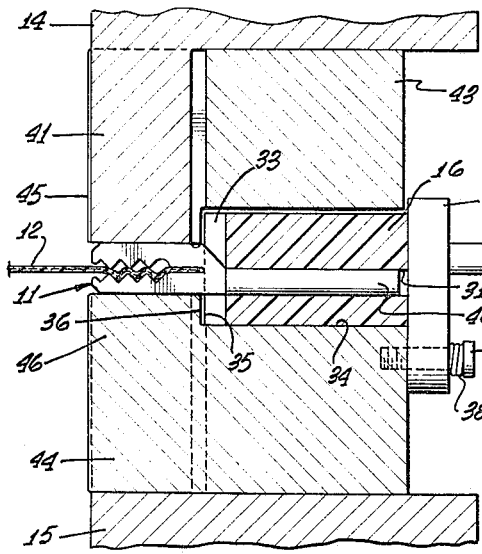
Figure 7:
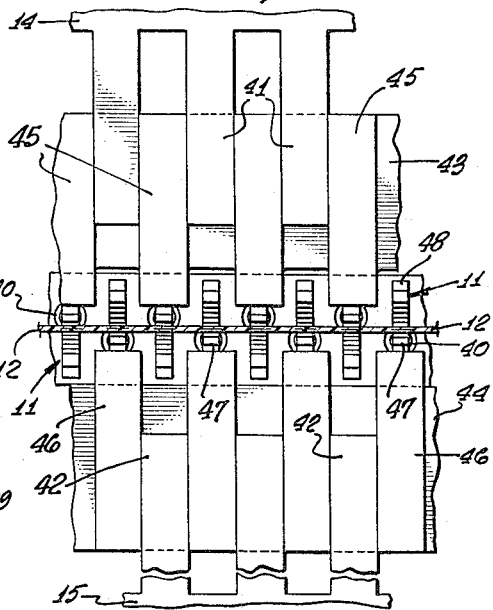

That these and other objects and advantages are attained, will be readily apparent to those skilled in the art from a consideration of the following detailed description of a preferred embodiment of this invention, when reference is made to the accompanying drawings, in which:

FIGURE 1 is a perspective view in elevation of the tool of this invention;
FIGURE 2 is a front elevation view of the tool;
FIGURE 3 is a sectional view of the tool taken along lines 3—3 of FIGURE 2;
FIGURES 4, 5 and 6 are enlarged sectional views of the tool as seen along line 4—4 of FIGURE 2, showing the movable die member in various positions during the operation of the tool;
FIGURE 7 is a front view of the tool as seen along the line 7—7 of FIGURE 5;
FIGURE 8 is a top view showing the flat electrical conductors having the crimped termination elements attached thereto;
FIGURE 9 is a sectional view partly in elevation of a crimped termination element attached to a flat electrical conductor taken along the line 9—9 of FIGURE 8;
FIGURE 10 is a sectional view taken along the line 10—10 of FIGURE 9 showing the ends of termination elements crimped to flat electrical conductors;
FIGURE 11 shows an enlarged side view of a flat electrical conductor and a termination element crimped thereto;
FIGURE 11 is a view taken along the line 12—12 of FIGURE 11; and
FIGURE 13 is a sectional view of the tool showing the movable die member in an intermediate position prior to the final crimping operation.

Referring to the drawings, the tool of this invention, generally designated by the numeral 10, is shown to be an integrated structural arrangement of interrelated members providing apparatus whereby a multiplicity of termination elements 11 are securely crimped to a like multiplicity of flat electrical conductors 12 which are shown as flat conductor ribbons of a flat electrical cable 13, commonly known as a strip cable. The flat electrical conductors 12 of strip cable 13 are clamped between the two die members 14 and 15 by structural members of the tool 10 to be more fully described hereinbelow. The die members 14 and 15 may both be made to be movable members, or alternatively only one of the die members may be made to be a movable member, as is the case in the embodiment of this invention illustrated in the drawings. Termination elements 11 which are to be crimped to the flat electrical conductors 12 are held securely in position between the two die members by a carrier strip 16 to be more fully described hereinbelow. For purposes of illustrating this invention, the upper die member 14 is shown as being moved by a piston 17. Piston 17 is responsive to hydraulic pressure produced by a controllable hydraulic fluid supply source 18. Although for illustrative purposes, a manually operated hydraulic pump has been shown as constituting the fluid supply source 18, it is to be understood that other means, operated either electrically, mechanically, hydraulically or pneumatically, may be utilized for actuating the upper die member 14.

As the two die members are forced into close proximity by the downward movement of piston 17 as seen in FIGURE 1, a multiplicity of termination elements 11 are securely crimped to a like multiplicity of flat electrical conductors 12 in a manner to be more fully described hereinbelow.

Hydraulic pressure produced by the hydraulic fluid supply source 18 is transmitted through a fluid transfer line 19 to a cylindrical chamber 20. Hydraulic pressure within the chamber 20 acts on piston 17 to move the piston 17 in a downward direction as seen in FIGURES 1 and 2, against the movable die member 14. A pressure gauge 21 is connected into the fluid transfer line 19. When gauge 21 shows that a required predetermined pressure has been applied to the piston 17, that predetermined pressure reading on gauge 21 serves as an indication that the crimping of the termination elements to the flat electrical conductors has been completed. At that time the fluid supply source 18 may be controlled so as to relieve the pressure on piston 17. Subsequently a new set of termination elements and flat electrical conductors may be inserted into the tool 10 in a manner to be more fully described hereinbelow and further crimping operations may then be performed by the tool 10.

The primary supporting structure for the crimping tool 10 is a "C" shaped body member 22. The lower portion of the body member 22 supports a platform 23 to which the lower die member 15 is attached. Guide posts 24 and 24' are mounted on platform 23 and extend vertically through clamping members 25, 26 and 25', 26' respectively, and thence through upper die member 14. Compression springs 27, 28 and 27', 28' are mounted on posts 24 and 24', respectively. The springs 27, 27' and 28, 28' are compressed when the upper die member 14 is moved in a downward direction as seen in FIGURE 2. As indicated hereinbefore upper die member 14 is moved in a downward direction when hydraulic pressure is applied to the upper surface of piston 17. When hydraulic pressure is relieved from piston 17, the combined spring force of the springs 27, 27' and 28, 28' returns the upper die member 14 and the piston 17 to the positions they occupied prior to the application of hydraulic pressure to the piston 17. Springs 28 and 28' are compressed only a slight amount by the downward movement of upper die member 14. Thus, springs 28 and 28' are primarily useful in providing support for and in centering clamping members 26 and 26'.

Referring to FIGURES 1 and 12 of the drawings, the flat electrical cable 13 is shown clamped between clamping members 25, 26 and 25', 26'.

As best shown in FIGURE 2 the guide posts 24 and 24' will serve to laterally position the cable 13 for proper registry between the flat conductors 12 and the termination elements 11. However, it is to be understood that other structure may be employed for providing proper lateral positioning of the cable 13, as for example guide structure, not shown in the drawings, which may be mounted on clamping members 25 and 25' or clamping members 26 and 26'.

Referring to FIGURE 2, the clamping members 25, 26 and 25', 26' are shown separated by the force of the spring members 29 and 29', respectively. When locking members 30 and 30' are pulled from their positions as shown in FIGURE 2 to the positions shown in FIGURES 1 and 12, clamping members 25, 26 and 25', 26' are forced together against the opposing force exerted by springs 29 and 29'. In this manner, clamping members 25, 26 and 25', 26' hold the strip cable 13 of flat electrical conductors 12 in a position so that the die members 14 and 15 are able to securely crimp termination elements 11, shown in FIGURE 4, for example, to the ends of the flat electrical conductors 12.

FIGURES 4 through 6 show a termination element 11 as it is being crimped to a flat electrical conductor 12. The termination element 11 is held securely in position for the crimping action by means of a carrier strip 16. The tubular end 40 of the termination element 11 is first inserted in a cylindrical bore 31 within the carrier strip 16. A flat portion 32 of the angular jaw 48 of the termination element 11 fits into a slot 33 provided on one side of the carrier strip 16. The slot 33 prevents the element 11 from changing its vertical position in relation to the carrier strip 16. The carrier strip 16 holding the termination element 11, is then placed on the surface 34 of a cross bar 44 within the tool 10. The carrier strip 16 is then moved to the left, as seen in FIGURE 4, until the left side 35 of the carrier strip 16 firmly abuts shoulder 36 on the cross bar 44. When the carrier strip 16 abuts shoulder 36, each termination element 11 held by the carrier strip 16 is then in proper position for receiving a flat electrical conductor 12.

A pivotable back support 37 is mounted on the cross bar 44 for clamping carrier strip 16 into position. A spring 38, mounted between support 37 and the head of a retaining bolt 39, exerts a force against support 37 thus holding support 37 and carrier strip 16 in position in relation to the other members of the tool 10.

After the carrier strip 16, holding termination elements 11, has been properly positioned and secured within the tool 10 the cable 13 may be inserted into the tool. The cable 13 is inserted from the forward part of the tool 10, as seen to the left in FIGURES 1 and 3, to the rearward part of the tool, as seen to the right in FIGURES 1 and 3. The cable 13 is inserted between clamping members 25, 25' and 26, 26' and toward the rearward part of tool 10 until the leading edge of the cable comes into an abutting relationship with the open jaws of the termination elements 11. When each flat conductor 12 of the cable 13 has been inserted into the open jaws of a termination element 11 so that the conductor 12 contacts the rearward portion of the open jaws of the termination element, the locking members 30 and 30' are then moved in a downward direction from their positions as shown in FIGURE 2 to their positions as shown in FIGURES 1 and 13 in order to securely clamp the cable 13 between clamping members 25, 25' and 26, 26' and between the upper and lower die members 14 and 15.

After the crimping action has been completed, support 37 may be rotated clear of the carrier strip 16 and the carrier strip 16 then removed from the tool 10. Another carrier strip holding termination elements may then be inserted into the tool for a subsequent crimping operation.

Since the termination elements 11 are crimped to the flat electrical conductors 12, the tubular ends 40 of the termination elements 11 slide free from the carrier strip 16 when the carrier strip 16 is removed from the tool 10. When hydraulic pressure is relieved from the piston 17, the combined spring force of the compression springs 27, 27' and 28, 28' moves the upper die member 14 free from the flat electrical conductors 12. The flat electrical conductors 12 and the termination elements 11 crimped thereto, may then be removed from the tool 10 by moving the locking members 30 and 30' from their positions as shown in FIGURES 1 and 12 to their positions as shown in FIGURE 2.

Referring to FIGURES 2 and 13, it can be seen that the upper and lower die members 14 and 15 are provided with teeth-like extensions 41 and 42, respectively. Also from FIGURE 2 it can be seen that cross bars 43 and 44 extend between clamping members 25, 25' and 26, 26', respectively. The cross bar 43 is integral with the clamping members 25 and 25' and the cross bar 44 is integral with the clamping members 26 and 26'. The cross bars 43 and 44 are also provided with teeth-like extensions 45 and 46, respectively. The teeth 41 on upper die member 14 mesh with the extensions 45 on the cross bar 43 and the teeth 42 on lower die member 15 mesh with the extensions 46 on the cross bar 44.

Referring to FIGURES 4 through 7 the sequence of operation for the upper die member 14, cross bar 43, and cross bar 44 is shown as the termination elements 11 are crimped to the flat electrical conductors 12. FIGURE 4 shows the cross bar 43 with its extensions 45 in a raised position prior to the movement of locking members 30 and 30' from their positions as shown in FIGURE 2 to their positions as shown in FIGURE 12. FIGURES 5 and 7 show the cross bar 43 and its extensions 45 in position after the locking members 30 and 30' have been moved to their positions as shown in FIGURE 13.

As seen in FIGURES 4 and 5 the termination elements 11 have a pair of opposed, spaced crimping jaws 47 and 48 which extend from the flat body portion 32 of the termination element. Preferably, one of the jaws, 47, extends generally in alignment with the tubular portion 40, while the other jaw 48 extends at an angle with respect to the jaw 47 from an apex in the flat body 32 prior to the crimping operation, the jaws 47 and 48 being substantially parallel after the crimping operation. As shown in FIGURES 5, 7 and 10 the termination elements 11 are held in the carrier strip 16 in a staggered relationship. Referring to FIGURES 5 and 10 it can be seen that the tubular ends 40 of the termination elements 11 are held in a staggered relationship within the carrier strip 16. The tubular ends 40 are staggered as shown in FIGURE 10, in order to provide a maximum distance between termination elements on adjacent flat electrical conductors. Such a spaced relationship between the tubular ends 40 of adjacent termination elements is desirable so that a maximum voltage may be impressed on the flat electrical conductors without inducing effects such as electrical cross-over and the like. In order to provide for a staggered relationship of the termination elements 11, the carrier strip 16 must be designed to have adjacent bores 31 in a staggered relationship. When the tubular ends 40 of the termination elements 11 are placed in the bores 31 of the carrier strip 16 the angular jaws 48 of the termination elements are positioned so that adjacent termination elements 11 will have their respective angular jaws 48 facing in opposite directions, as may be seen in FIGURES 4, 5, 7 and 10 of the drawings.

As best seen in FIGURE 7 termination elements 11 are held by carrier strip 16 so that a single termination element is held in a vertical position between each of the teeth 41 of the upper die member 14 and each corresponding extension 46 on cross bar 44. Likewise termination elements 11 are properly positioned by carrier strip 16 so that a single termination element is held in a vertical position between each of the teeth 42 of the lower die member 15 and each corresponding extension 45 on the cross bar 43. The termination elements are placed in the carrier strip 16 so that adjacent termination elements will have their respective jaw members 47 facing alternately in an upward and in a downward direction, as best seen in FIGURES 4, 5, 7 and 10. The termination elements 11 are held by the carrier strip 16 so that downwardly facing jaws 47 will initially establish a contacting relationship with the extensions 46 on cross bar 44 and the upwardly facing jaws 47 will come into contacting relationship with the extensions 45 when the cross bar 43 is moved in a downward direction by the downward movement of locking members 30 and 30' from their positions as shown in FIGURE 2 to their positions as shown in FIGURE 12.

The downward movement of the locking members 30 and 30', as their positions are changed from that shown in FIGURE 2 to that shown in FIGURE 12, clamps the following members together, clamping members 25, 25' and cross bar 43, clamping members 26, 26' and cross bar 44, and the cable 13 of flat electrical conductors 12. When the carrier strip 16 is secured to cross bar 44 by the pivotable securing member 37 the carrier strip 16 then, in effect, becomes a part of the cross bar 44 and will have the same movement within the tool 10 as does the cross bar 44. Thus when the locking members 30 and 30' are moved into clamping position the structural members within tool 10 consisting of clamping members 25, 25', 26, 26', cross bars 44, 43, cable 13, carrier strip 16 and termination elements 11 held by the carrier strip 16 are clamped together to form a single movable unit, generally designated by the numeral 49. As the upper die member 14 is moved in a downward direction the force exerted on the upper die member is applied to the movable unit 49 through the compression springs 27 and 27'. As the upper die member 14 is moved further in a downward direction, as seen in FIGURES 4 through 6, the teeth 41 of the upper die member 14 contact the upwardly directed angular jaws 48 of the termination elements 11. As the upper die member 14 is moved further in a downward direction the force exerted on the upper die member is applied to the movable unit 49 through the compression springs 27, 27' and through the teeth 41 of the upper die member 14 which are in contact with the upwardly directed angular jaws 48 of the termination elements 11. With the further downward movement of the upper die member 14 and the movable unit 49 the downwardly directed angular jaws 48 of the termination elements 11 are contacted by the teeth 42 of the lower die member 15. Additional downward movement of the upper die member 14 and the movable unit 49 effects a binding or crimping of the jaws 48 thereby firmly crimping the termination elements 11 to their respective aligned flat electrical conductors 12.

FIGURES 8 and 12 show a multiplicity of termination elements 11 crimped to a like multiplicity of flat electrical conductors 12. These figures show the spacing between adjacent termination elements which are crimped to the flat electrical conductors. FIGURE 11 shows a termination element 11 properly crimped to a flat electrical conductor 12 so that the flat electrical conductor and the termination element crimped thereto are in a properly attached relationship for their final use.

While certain preferred embodiments of this invention have been specifically disclosed, it is understood that the invention is not limited thereto, as many variations will be readily apparent to those skilled in the art, and the invention is to be given its broadest possible interpretation consistent with the prior art.

Having thus described our invention, we claim:

1. A tool for crimping termination elements to the electrical conductors of a flat electrical cable wherein said cable has a plurality of parallel flat electrical conductors, said tool comprising:
    means within said tool for mounting a flat electrical cable having a plurality of flat electrical conductors;
    means for mounting a plurality of termination elements in concurrent alignment with respective electrical conductors of the flat electrical cable; and
    movable means for simultaneously crimping the plurality of termination elements to respective aligned electrical conductors of the flat electrical cable, each termination element being securely crimped to a respective aligned flat electrical conductor so as to thereby establish a firm electrical connection between the flat electrical conductor and the termination element crimped thereto.

2. A tool for crimping termination elements to the electrical conductors of a flat electrical cable in accordance with claim 1 wherein said means for mounting a plurality of termination elements includes a carrier strip, one side of said carrier strip being provided with a plurality of slots therein, each slot within one side of said carrier strip being provided with a cylindrical opening and the cylindrical openings, provided for the plurality of slots, being arranged in a staggered relationship.

3. A tool for crimping termination elements to the electrical conductors of a flat electrical cable in accordance with claim 2 wherein said means for mounting a plurality of termination elements includes a pivotally mounted support member which securely holds said carrier strip in proper position within said tool and which support member may be rotated clear of contact with said carrier strip when it is desired to remove said carrier strip from said tool.

4. A tool for crimping termination elements to the electrical conductors of a flat electrical cable wherein said cable has a plurality of parallel flat electrical conductors, said tool comprising:
 a first die member;
 a second die member;
 said first die member being free to move into close proximity with said second die member;
 means within said tool for mounting between said die members a flat electrical cable having a plurality of flat electrical conductors;
 means for mounting between said die members a plurality of termination elements concurrently in alignment with respective electrical conductors of the flat electrical cable;
 and means for moving said first die member into close proximity with said second die member so as to simultaneously crimp the plurality of termination elements to respective aligned electrical conductors of the flat electrical cable thereby establishing a firm electrical connection between the electrical conductor and the termination element crimped thereto.

5. A tool for crimping termination elements to the electrical conductors of a flat electrical cable wherein said cable has a plurality of parallel flat electrical conductors, said tool comprising:
 a first die member;
 a second die member;
 said first die member being free to move into close proximity with said second die member;
 means for mounting a flat electrical cable having a plurality of flat electrical conductors;
 a removably mounted carrier strip for mounting a plurality of termination elements in alignment with the electrical conductors of the flat electrical cable, said carrier strip being provided with a plurality of recesses for receiving the termination elements,
 and means for moving said first die member into close proximity with said second die member so as to crimp the plurality of termination elements to respective aligned electrical conductors of the flat electrical cable thereby establishing a firm electrical connection between the electrical conductor and the termination element crimped thereto.

6. A tool for crimping termination elements to the electrical conductors of a flat electrical cable wherein said cable has a plurality of parallel flat electrical conductors, said tool comprising:
 a first die member;
 a second die member;
 said first die member being free to move into close proximity with said second die member;
 means for concurrently positioning a plurality of termination elements between said first and said second die members;
 guide means for guiding a flat electrical cable having a plurality of electrical conductors into said tool, said guide means facilitating the alignment of the electrical conductors with respective termination elements positioned between said first and said second die members;
 means for clamping the flat electrical cable at opposite edge portions only between said first and said second die members so that the electrical conductors of the cable remain in alignment with respective termination elements positioned between said first and second die members;
 and means for moving said first die member into close proximity with said second die member so as to simultaneously crimp the plurality of termination elements to respective aligned electrical conductors of the flat electrical cable thereby establishing a firm electrical connection between the electrical conductor and the termination element crimped thereto.

7. A tool for crimping termination elements to the electrical conductors of a flat electrical cable wherein said cable has a plurality of parallel flat electrical conductors, said tool comprising:
 a first die member;
 a second die member;
 said first die member being free to move in close proximity with said second die member;
 a removably mounted carrier strip for positioning a plurality of termination elements between said first and said second die member, said carrier strip being provided with a plurality of recesses for receiving the termination elements.
 guide means for guiding a flat electrical cable having a plurality of electrical conductors into said tool, said guide means facilitating the alignment of the electrical conductors with respective termination elements positioned between said first and said second die members;
 means for clamping the flat electrical cable between said first and said second die members so that the electrical conductors of the cable remain in alignment with respective termination elements positioned between said first and said second die members;
 and means for moving said first die member into close proximity with said second die member so as to crimp the plurality of termination elements to respective aligned electrical conductors of the flat electrical cable thereby establishing a firm electrical connection between the electrical conductor and the termination element crimped thereto.

8. A tool for crimping termination elements to the electrical conductors of a flat electrical cable wherein said cable has a plurality of parallel flat electrical conductors, said tool comprising:
 a first die member;
 a second die member;
 said first die member being free to move into close proximity with said second die member;
 means within said tool for mounting between said die members a flat electrical cable having a plurality of flat electrical conductors:
 means for mounting between said die member a plurality of termination elements concurrently in alignment with respective electrical conductors of the flat electrical cable;
 means for moving said first die member into close proximity with said second die member so as to simultaneously crimp the plurality of termination elements to respective aligned electrical conductors of the flat electrical cable when said first die member is moved into close proximity with said second die member;
 and means for removing said first die member from the close proximity of said second die member after the plurality of termination elements have been crimped to respective aligned electrical conductors of the flat electrical cable.

9. A tool for crimping termination elements to the electrical conductors of a flat electrical cable wherein said cable has a plurality of parallel flat electrical conductors, said tool comprising:
 a first die member;
 a second die member;
 said first die member being free to move into close proximity with said second die member;
 means for moving said first die member into close proximity with said second die member;
 spaced apart guide means for guiding said first die member into close proximity with said second die member;
 a first clamping member mounted on one of said guide means and positioned to engage a marginal portion of the flat cable;

a second clamping member mounted on a second one of said guide means and positioned to engage the opposite marginal portion of the flat cable;

means for moving said first clamping member and means for moving said second clamping member into a clamping relationship so as to securely clamp a flat electrical cable having a plurality of parallel flat electrical conductors between said first and said second die members;

and means for positioning a pluraliity of termination elements in alignment with respective electrical conductors of the flat electrical cable so that the plurality of termination elements will be securely crimped to the respective aligned electrical conductors of the flat electrical cable when said first die member is moved into close proximity with said second die member.

10. A tool for crimping termination elements to the electrical conductors of a flat electrical cable wherein said cable has a plurality of parallel flat electrical conductors, said tool comprising:

a first die member;

a second die member;

said first die member being free to move into close proximity with said second die member;

means for moving said first die member into close proximity with said second die member;

means for positioning a flat electrical cable having a plurality of flat electrical conductors between said first die member, and said second die member;

a carrier strip for mounting a plurality of termination elements in alignment with respective electrical conductors of the flat electrical cable;

said carrier strip being provided with a plurality of cylindrical openings;

said carrier strip being provided further with a plurality of adjacently disposed slots;

each cylindrical opening and each adjacently disposed slot being adapted to receive a first and a second portion respectively of each termination element positioned by said carrier strip;

and means for moving said first die member into close proximity with said second die member so as to crimp the plurality of termination elements to respective aligned electrical conductors of the flat electrical cable thereby establishing a firm electrical connection between the electrical conductor and the termination element crimped thereto.

11. A tool for crimping termination elements to the electrical conductors of a flat electrical cable wherein said cable has a plurality of parallel flat electrical conductors, said tool comprising:

a first die member;

a second die member;

said first die member being free to move into close proximity with said second die member;

guide means for guiding said first die member into close proximity with said second die member;

a first clamping member mounted on said guide means;

a second clamping member mounted on said guide means;

resilient means mounted between said first clamping member and said second clamping member, said resilient means exerting a force which opposes the movement of said first clamping member toward said second clamping member;

releasable locking means mounted on one of said clamping members, said locking means being free to move from a first position to a second position so as to thereby force said first clamping member into a clamping relationship with said second clamping member in order to securely clamp a flat electrical cable having a plurality of parallel flat electrical conductors between said first and said second die members;

means for positioning a plurality of termination elements in alignment with respective electrical conductors of the flat electrical cable clamped between said first and said second die member;

and means for moving said first die member into close proximity with said second die member so as to crimp the plurality of termination elements to respective aligned electrical conductors of the flat electrical cable thereby establishing a firm electrical connection between the electrical conductor and the termination element crimped thereto.

12. A tool for crimping termination elements to the electrical conductors of a flat electrical cable wherein said cable has a plurality of parallel flat electrical conductors, said tool comprising:

a first die member;

a second die member;

said first die member being free to move into close proximity with said second die member;

means for moving said first dies member into close proximity with said second die member;

guide means for guiding said first die member into close proximity with said second die member;

a first clamping member mounted on said guide means;

a second clamping member mounted on said guide means;

locking means mounted on one of said clamping members;

said locking means being freely movable so that the movement of said locking means in one direction will force said first and said second clamping members into a clamping relationship in order to securely clamp a flat electrical cable having a plurality of parallel flat electrical conductors between said first and said second die member;

a first compression spring mounted on said guide means, said first compression spring being mounted between said first die member and said first clamping member;

a second compression spring mounted on said guide means, said second compression spring being mounted between said second die member and said second clamping member, said first and said second compression springs being compressed when said first die member is moved in the direction of said second die member;

and means for positioning a plurality of termination elements in alignment with respective electrical conductors of the flat electrical cable to that the plurality of termination elements will be securely crimped to the respective aligned electrical conductors of the flat electrical cable when said first die member is moved into close proximity with said second die member.

13. A tool for crimping termination elements to the electrical conductors of a flat electrical cable wherein said cable has a plurality of parallel flat electrical conductors, said tool comprising:

a movable die member;

a stationary die member;

a C shaped body member, said C shaped body member providing support structure for said stationary die member;

means for moving said movable die member into close proximity with said stationary die member;

guide means for guiding said movable die member into close proximity with said stationary die member, said guide means being supported by said body member;

a first clamping member mounted on said guide means;

a second clamping member mounted on said guide means;

resilient means mounted between said first clamping member and said second clamping member, said resilient means exerting a force which tends to oppose the movement of said first clamping member toward said second clamping member;

locking means mounted on one of said clamping members;

said locking means being freely movable so that the movement of said locking means in one direction will force said first and said second clamping members into a clamping relationship in order to securely clamp a flat electrical cable having a plurality of parallel flat electrical conductors between said movable and said stationary die members;

and means for positioning a plurality of termination elements in alignment with respective electrical conductors of the flat electrical cable so that the plurality of termination elements will be securely crimped to the respective aligned electrical conductors of the flat electrical cable when said movable die member is moved into close proximity with said stationary die member.

14. A tool for crimping termination elements to the electrical conductors of a flat electrical cable wherein said cable has a plurality of parallel flat electrical conductors, said tool comprising:

a first die member;

a second die member;

said first die member being free to move into close proximity with said second die member;

a removably mounted carrier strip for positioning a plurality of termination elements between said first and said second die members, said carrier strip being provided with a plurality of recesses adapted to receive termination elements to be positioned between said first and said second die members;

guide means for guiding a flat electrical cable having a plurality of electrical conductors into said tool, said guide means facilitating the alignment of the electrical conductors with respective termination elements positioned between said first and said second die members;

guide means for guiding said second die member into close proximity with said first die member;

a first clamping member mounted on said guide member;

a second clamping member mounted on said guide means;

resilient means mounted between said first clamping member and said second clamping member, said resilient means exerting a force which tends to oppose the movement of said first clamping member in the direction of said second clamping member;

locking means mounted on one of said clamping members, said locking means being freely movable so that the movement of said locking means in one direction will force said first and said second clamping members into a clamping relationship in order to securely clamp a flat electrical cable having a plurality of parallel flat electrical conductors between said first and said second die members;

a first compression spring mounted on said guide means, said first compression spring being mounted between said first die member and said first clamping member;

a second compression spring mounted on said guide means, said second compression spring being mounted between said second die member and said second clamping member, said first and said second compression springs being compressed when said first die member is moved in the direction of said second die member;

and means for moving said first die member into close proximity with said second die member so as to crimp the plurality of termination elements to respective aligned electrical conductors of the flat electrical cable, thereby establishing a firm electrical connection between the electrical conductor and the termination element crimped thereto.

15. A tool for crimping termination elements to the electrical conductors of a flat electrical cable wherein said cable has a plurality of parallel flat electrical conductors, said tool comprising:

a first die member, said first die member being provided with a plurality of teeth;

a second die member, said second die member being provided with a plurality of teeth;

said first die member being free to move into close proximity with said second die member;

means for mounting a plurality of termination elements between said first die member and said second die member;

means for guiding a flat electrical cable having a plurality of electrical conductors into said tool, said cable guiding means facilitating the alignment of the electrical conductors with respective termination elements mounted between said first die member and said second die member;

guide means for guiding said first die member into close proximity with said second die member;

a first clamping member mounted on said guide means;

a second clamping member mounted on said guide means;

means for moving said first clamping member and said second clamping member into a clamping relationship so as to securely clamp a flat electrical cable having a plurality of flat electrical conductors between said first and said second die members;

a first crossbar, said first crossbar being integral with said first clamping member, said first crossbar being provided with a plurality of teeth-like extensions, the extensions of said first crossbar meshing with the teeth of said first die member;

a second crossbar, said second crossbar being integral with said second clamping member, said second crossbar being provided with a plurality of teethlike extensions, the extensions of said second crossbar meshing with the teeth of said second die member, the teeth of said first die member being opposite the extensions of said second crossbar and the teeth of said second die member being opposite the extensions of said first crossbar;

a first compression spring mounted on said die member guide means, said first compression spring being mounted between said first die member and said first clamping member;

a second compression spring mounted on said die member guide means, said second compression spring being mounted between said second die member and said second clamping means;

the force effecting the downward movement of said second die member being transferred to said first and said second clamping members and to said first and said second cross bars through said first compresion spring;

and means for moving said first die member into close proximity with said second die member so that the downward movement of said first die member and said first crossbar will firmly crimp a plurality of termination elements to respective aligned flat electrical conductors, adjacently disposed termination elements being alternately crimped between the teeth of said first die member and the extensions of said second crossbar and between the teeth of said first crossbar and the teeth of said second die member.

16. A tool for crimping termination elements to the electrical conductors of a flat electrical cable wherein said cable has a plurality of parallel flat electrical conductors, said tool comprising:

a first die member, said first die member being provided with a plurality of teeth;

a second die member, said second die member being provided with a plurality of teeth;

said first die member being free to move into close proximity with said second die member;

means for mounting a plurality of termination elements between said first die member and said second die member;

clamping means for mounting the electrical conductors of a flat electrical cable in alignment with respective termination elements;

a first crossbar connected to said clamping means, said first crossbar being provided with a plurality of teeth-like extensions, said extensions meshing with the teeth on said first die member;

a second crossbar connected to said clamping means, said second crossbar being provided with a plurality of teeth-like extensions, said extensions meshing with the teeth on said second die member;

the teeth on said first die member being opposite the extensions on said second crossbar, and the extensions on said first crossbar being opposite the teeth on said second die member so that adjacently disposed termination elements are alternately crimped between the teeth of said first die member and the extensions of said second crossbar, and between the extensions of said first crossbar and the teeth of said second die member when said first die member is moved into close proximity with said second die member.

17. A carrier strip for positioning termination elements within a tool for crimping the termination elements to the electrical conductors of a flat electrical cable, which termination elements embody flat sided portions and extending cylindrical portions and require predetermined rotational orientation, the carrier strip comprising a bar having a plurality of horizontally adjacent slots in one face thereof, said slots being defined by generally flat walls, each slot communicating with a cylindrical bore extending into the bar, said slots being adapted to receive the flat portions of the termination elements effecting a predetermined rotational orientation of said termination elements within said crimping tool, and the cylindrical bores being adapted to receive the cylindrical portions of the termination elements.

18. A carrier strip as defined in claim 17 in which the cylindrical bores are alternately staggered vertically with one group lying in a first generally horizontal flat pattern and another group lying in a second generally horizontal flat pattern vertically offset from the first.

References Cited by the Examiner
UNITED STATES PATENTS

| | | | |
|---|---|---|---|
| 2,827,940 | 3/1958 | Davis et al. | 29—203 |
| 2,958,869 | 11/1960 | Drukker et al. | 29—203 |
| 3,021,738 | 2/1962 | Anderson et al. | 72—407 |
| 3,167,107 | 1/1965 | Ustin et al. | 72—421 |

CHARLES W. LANHAM, *Primary Examiner.*

R. D. GREFE, *Assistant Examiner.*